(12) United States Patent
Chen et al.

(10) Patent No.: US 10,415,374 B2
(45) Date of Patent: Sep. 17, 2019

(54) LOGGING-WHILE-DRILLING OPTICAL FIBER COMMUNICATION DEVICE

(71) Applicants: Southwest Petroleum University, Chengdu (CN); Haohan Well Completion & Logging Science and Technology Limited Company, Chengdu (CN)

(72) Inventors: Xingyu Chen, Chengdu (CN); Yingfeng Meng, Chengdu (CN); Gao Li, Chengdu (CN); Yijian Chen, Chengdu (CN); Yang Wang, Nanchong (CN); Lunping Zhang, Chengdu (CN)

(73) Assignees: Southwest Petroleum University, Chengdu (CN); HAOHAN WELL COMPLETION & LOGGING SCIENCE AND TECHNOLOGY LIMITED COMPANY, Chengdu (CN)

( * ) Notice: Subject to any disclaimer, the term of this patent is extended or adjusted under 35 U.S.C. 154(b) by 14 days.

(21) Appl. No.: 15/922,937

(22) Filed: Mar. 16, 2018

(65) Prior Publication Data

US 2019/0024504 A1 Jan. 24, 2019

(30) Foreign Application Priority Data

Jul. 21, 2017 (CN) .......................... 2017 1 0600728

(51) Int. Cl.
*E21B 47/12* (2012.01)
*G02B 6/50* (2006.01)
*G02B 6/44* (2006.01)

(52) U.S. Cl.
CPC .......... *E21B 47/123* (2013.01); *G02B 6/4428* (2013.01); *G02B 6/504* (2013.01)

(58) Field of Classification Search
CPC ...... E21B 47/123; G02B 6/4428; G02B 6/504
USPC ....................................................... 340/854.7
See application file for complete search history.

(56) References Cited

U.S. PATENT DOCUMENTS

| | | | |
|---|---|---|---|
| 2003/0020631 A1* | 1/2003 | Haase | E21B 47/12 340/853.1 |
| 2010/0084132 A1* | 4/2010 | Noya | E21B 17/206 166/254.2 |
| 2011/0044697 A1* | 2/2011 | Peter | E21B 47/123 398/140 |

(Continued)

*Primary Examiner* — Albert K Wong
(74) *Attorney, Agent, or Firm* — Gokalp Bayramoglu

(57) ABSTRACT

A logging-while-drilling optical fiber communication device includes a rotary wireless transceiver module fixed on a protective connector; an active antenna of the rotary transceiver is placed in the first drill pipe by drilling hole through the protective connector; an optical fiber communication drawworks is located at the top of a second drill pipe, the optical fiber is downwardly released into other under-well drill pipes, the bottom of the optical fiber is connected with the well-bottom wireless receiving module; the lowest part of the drill pipe are provided with a drilling data acquisition device and a well-bottom wireless transmitting module. In the present invention, the optical fiber cable is used as transmission medium, by the means of modulating information data obtained by well logging into optical wave, and transmitting to the optical communication link, high-speed bi-directional transmission of well logging information can be realized.

3 Claims, 2 Drawing Sheets

(56) References Cited

U.S. PATENT DOCUMENTS

| | | | | |
|---|---|---|---|---|
| 2011/0140907 A1* | 6/2011 | Louden | ............... | E21B 47/123 340/854.3 |
| 2016/0069178 A1* | 3/2016 | Mulholland | ............ | E21B 33/03 166/65.1 |
| 2017/0362926 A1* | 12/2017 | Difoggio | ............ | G01N 29/4436 |
| 2018/0087375 A1* | 3/2018 | Segura Dominguez | ..................... | H04J 14/02 |
| 2018/0355682 A1* | 12/2018 | Pessin | .................. | E21B 47/123 |

\* cited by examiner

LOGGING-WHILE-DRILLING OPTICAL FIBER COMMUNICATION DEVICE

CROSS REFERENCE TO RELATED APPLICATIONS

This application is based upon and claims priority to Chinese Patent Application No. CN 201710600728.1, filed on 2017 Jul. 21, the entire content of which is incorporated herein by reference.

TECHNICAL FIELD

The present invention relates to the field of drilling technology, particularly to a logging-while-drilling optical fiber communication device.

BACKGROUND

Recently, the harsh underground conditions pose strict requirements for the transmission of underground sensor data. With the development of measurement-while-drilling technology, how to transmit the underground signal to the ground stably and efficiently has become a vital research subject in the field of drilling. Transmission and reception circuits of all kinds of transmission methods in traditional Computerized Logging System have high power consumption, low transmission efficiency and low anti-electromagnetic interference ability. With the continuous development of optical fiber communication technology, people pay more and more attention to the advantages of optical fiber and apply optical fiber communication in all aspects. The underground communication devices based on optical fiber communication emerged. Optical fiber digital communication technology has become one of the most promising technologies among various communication technologies. Optical fiber digital communication technology combines optical fiber communication, digital communication and network technology to bring all the advantages together. Due to the high frequency of light waves, optical fiber communication has larger capacity and wider bandwidth than ordinary cables, suitable for transmission of the high-speed, broadband information. The loss of the optical fiber is small, can greatly increase distance of the transmission without relay. The optical fiber communication transmits the optical signal, almost never radiates outwardly, and the data security is superior, at the same time it does not suffer crosstalk between the optical fibers in the same optical cable. Also, the optical fiber communication will not be affected by the electromagnetic interference, or produce electric spark and cause safety hazard to oil wells. The anti-explosion properties are good. The raw material of the glass fiber production is quartz, the sources of which are in abundance than the sources of copper, aluminum and other sources for manufacturing cables. The optical fiber is environment friendly, and the service life is long. Optical fiber is a kind of wire communication, long-distance transmission will cause energy loss, and due to different conditions while drilling, some positions are not suitable for transmitting the data by wired method, therefore, the wireless repeaters are used for signal amplification and relay at these position. The principle of the logging cable transmission is to use multi-core cable as a transmission medium, place the multi-core cable inside the drill pipe by embedded method, the transmission link can be set up after the drill pipes are connected and realize the bi-directional communication of the high-speed signals. Various commands and data signals are transmitted by cables between the ground control system and the underground apparatus, the ground-based computer can acquire the position of rig and the sensing information underground. When the sensor of the underground logger collects the data, it modulates the sensing information to digital electrical signal carrier through the digital modulator and sends the sensing information to the ground through the cable. The receiver processes preliminary treatment to the signal through the digital signal processing technology and demodulates the required information thereof. The same method is used for transmitting commands downwards from the ground. Cable transmission is one of the most widely used techniques in logging activity, either in deep wells or in shallow wells. Due to the fact that thicker cable leads to too much internal space of the drill pipe occupied by cable, and its mechanical manufacturing process is relatively complicated. The construction is difficult and the operation is not convenient during the process of on-site drilling. At the same time, cables may face many interference factors in the general logging remote sensing transmission environment. For example, the mineral magnetic materials in some strata will generate certain electromagnetic fields, and some radioactive materials will emit rays, which make the transmission link to be interfered susceptibly and occurrences of aberration or distortion of signal happen, thereby increasing the transmission error rate.

In conclusion, the problems of the existing technologies are as follows: the current drilling communication has the problem that the thicker cable leads to the excessive occupation of the internal space in the drill pipe, and the mechanical manufacturing process is relatively complicated; the construction is difficult and is inconvenient to operate; susceptible to be interfered and the aberration or distortion of signal occurs, the transmission error rate is high.

SUMMARY OF THE INVENTION

In view of the problems of the existing technology, the present invention provides a logging-while-drilling optical fiber communication device.

The present invention is implemented as follows.

A logging-while-drilling optical fiber communication device, includes:

a rotary wireless transceiver module;

a drill pipes including a first drill pipe, a second drill pipe and a set of under-well third drill pipes;

the rotary wireless transceiver module is fixed on the protective connector by welding; the active antenna of the rotary wireless transceiver module is put into the first drill pipe by drilling hole in the protective connector;

the optical fiber communication drawworks is clutched on the top part of the second drill pipe by a hook, and the downwards released optical fiber is put into other under-well drill pipes. The lower part of the optical fiber is connected with the well-bottom wireless receiving module; the optical fiber communication drawworks is placed inside the drill pipe and can move upwards and downwards inside the drill pipe while proceeding the drilling process, and the drawworks can retract and release the optical fiber; the lowest part of the drill pipe is the drilling data acquisition device and the well-bottom wireless transmitting module.

Further, the rotary wireless transceiver module is wirelessly connected to the overground wireless transceiver module, and the overground wireless transceiver module is connected to the over-ground data collection console.

Further, the optical fiber communication drawworks includes: a motor driving circuit;

the motor driving circuit is connected with the motor, the motor is connected with the lower end of the optical fiber reel and the lower end of the slide rail screw rod through the decelerator; the optical fiber guider is placed on the slide rail screw rod; the signal control circuit and the WiFi communication module are connected with the transceiver antenna;

the wireless power supply coil transmitting terminal is kept coupled with the wireless power supply coil receiving terminal located on the antenna;

the drawworks hook is located at the head of the drawworks; the pressure regulating piston is located on the top of the drawworks;

the silicon sealing is located on the inner side of the optical fiber outlet hole; the optical fiber outlet hole is located on the bottom of the drawworks.

The logging-while-drilling optical fiber communication device uses waves with short-wave wavelength of 650 nm or 850 nm to proceed data transmission.

Further, the drawworks sealing shell of the optical fiber communication drawworks is a metal shell, and the top of the drawworks is welded with a drawworks hook.

The invention has the advantages and positive effects of that: aiming at the problem about the continuous connection of the optical cable during addition of the drill pipes and the communication between ground and underground, the invention provides a drawworks which can store the optical fiber with the length of more than 5 km, a short-distance wireless transceiver module is set inside and is enabled to realize the logging-while-drilling communication. The drawworks is in a columnar shape with a diameter smaller than the inner diameter of the drill pipe, can be placed inside the drill pipe, and can be fixed at the bottom of the first drill pipe at the wellhead. As the drilling distance increases during drilling, the drill pipe, which the drawworks is located inside, gradually goes deep underground, during the continuous connection of the drill pipes, the drawworks can be manually raised to the bottom of the first drill pipe, at the same time the fiber with corresponding length is released downwards.

In the present invention, the optical fiber cable is used as a transmission medium, by the means of modulating information data obtained by well logging into an optical wave and transmitting to the optical communication link, the high-speed bi-directional transmission of well-logging information can be realized. The present invention mainly researches the logging-while-drilling signal transmission system based on the optical fiber and relay of microwave. Compared with traditional cable communication, optical fiber is an insulator, which is free from interference of electromagnetic waves, does not generate noise, and can withstand high temperature and high pressure environment underground. The stability and quality of communication are more than 5 times than that of the cable communication. The optical fiber is made of quartz glass. The material is accessible, corrosion-resistant and water-resistant. The cost is as low as RMB 100 yuan/1 km. The rate of the modulated logging-while-drilling fiber optical communication can reach 100 Mb/s. The way of using the microwave signal to relay makes the transmission of the logging-while-drilling information more flexible.

in the figures: 1、kelly; 2、protective connector; 3、antenna; 4、wireless transceiver module of drawworks; 5、optical fiber communication drawworks; 6、optical fiber; 7、well-bottom wireless receiving module; 8、well-bottom wireless transmitting module; 9、drilling data acquisition device; 10、drill bit; 11、rotary wireless transceiver module; 12、rat hole; 13 first drill pipe; 14、second drill pipe; 15、other under-well drill pipes; 16、overground transceiver module; 17、overground data collection console; 501、sealing shell; 502、battery; 503、motor driving circuit; 504、motor; 505、decelerator; 506、optical fiber reel; 507、optical fiber guider; 508、guider slide rail; 509、slide rail screw rod; 510、optical fiber; 511、signal control circuit; 512、WiFi communication module; 513、transceiver antenna; 514、wireless power supply coil transmitting terminal; 515、drawworks hook; 516、pressure regulating piston; 517、wireless supply coil receiving terminal; 518、silicon sealing; 519、optical fiber outlet hole.

DETAILED DESCRIPTION OF THE INVENTION

In order to further understand the content, features and effects of the present invention, the following embodiments are given below and are described in detail with reference to the accompanying drawings.

The structure of the present invention will be described in detail below with reference to the accompanying drawings.

Figure 1:
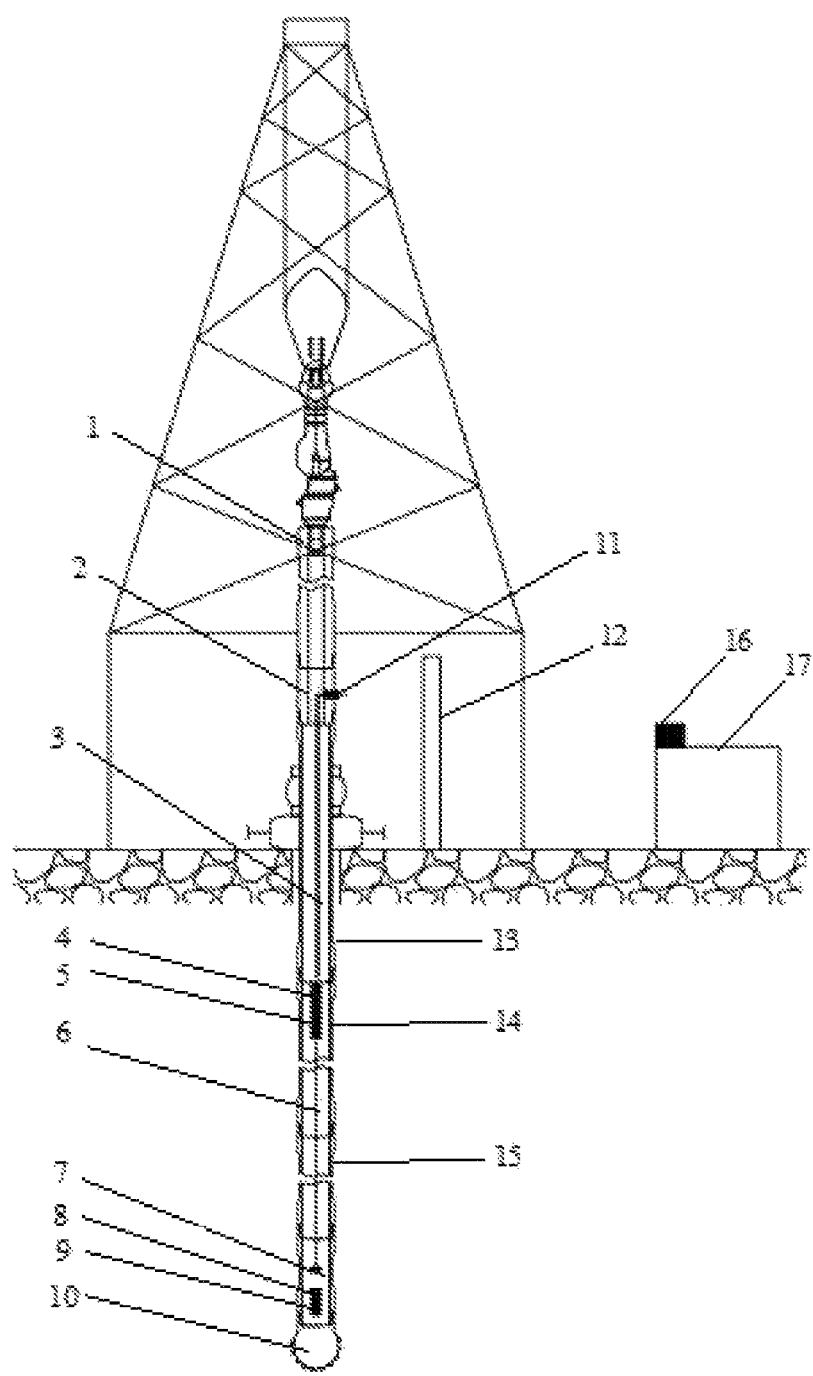
FIG. 1 is a structural schematic view of a logging-while-drilling optical fiber communication device accompany with an embodiment of the present invention.

Referring to FIG. 1, the logging-while-drilling optical fiber communication device provided by the embodiment of the present invention comprises kelly 1, protective connector 2, antenna 3, drawworks wireless transceiver module 4, optical fiber communication drawworks 5, optical fiber 6, well-bottom receiving module 7, well-bottom wireless transmitting module 8, drilling data acquisition device 9, drill 10, rotary wireless transceiver module 11, rat hole 12, first drill pipe 13, second drill pipe 14, other under-well drill pipes 15, overground transceiver module 16, overground data collection console 17. The logging-while-drilling optical fiber communication device uses waves with short-wave wavelength of 650 nm or 850 nm to proceed data transmission.

The rotary wireless transceiver module 11 is fixed on the protective connector 2; the active antenna 3 of the rotary wireless transceiver module 11 is put into the first drill pipe 13 by drilling holes in the protective connector 2, and at the same time the active antenna 3 is released to the bottom of the first drill pipe 13, to transmit and receive wireless signals. The optical fiber communication drawworks 5 is located at the top part of the second drill pipe 14, optical fiber 6 is released downwards into the other under-well drill pipe 15, the lower part of the optical fiber 6 is connected with wireless receiving module 7; the lowest part of the drill pipe is the drilling data acquisition device 9 and the well-bottom wireless transmitting module 8.

The rotary wireless transceiver module 11 is wirelessly connected to the overground wireless transceiver module 16, and the overground wireless transceiver module 16 is connected to the overground data collection console 17.

Figure 2:
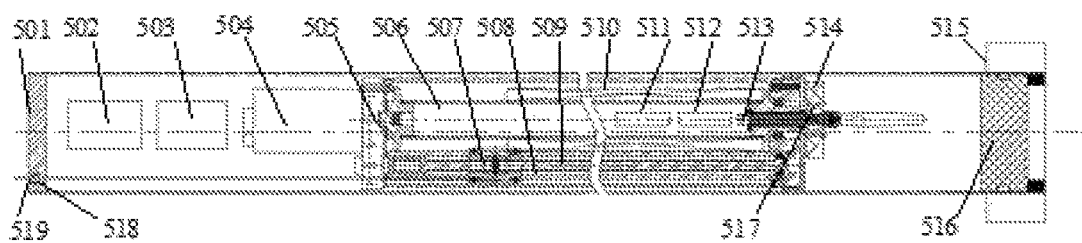
FIG. 2 is a structural schematic view of an optical fiber communication drawworks accompany with an embodiment of the present invention.

The structure of the optical fiber communication drawworks 5 is as shown in FIG. 2, the drawworks is placed inside the drill pipe and can move upwards and downwards inside the drill pipe while proceeding the drilling process, and the drawworks can retract and release the optical fiber; the motor driving circuit 503 is connected with the motor 504, the motor 504 is connected with the lower end of the optical fiber reel 506 and the lower end of the slide rail screw rod 509 through the decelerator 505. The optical fiber guider 507 is placed on the slide rail screw rod 509. The signal control circuit 511 and the WiFi communication module 512 is connected to the transceiver antenna 510. The signal control circuit 511 modulates the optical signal transmitted by the optical fiber into an electrical signal and transmits the electrical signal out of the well through the WiFi communication module 512 and the antenna 513. The control signal outside the well enters the drawworks through the WiFi communication module 512. The wireless power supply coil transmitting terminal 514 is coupled to the wireless power supply coil receiving terminal 517 located on the antenna 513, to form a wireless power supply system for supplying power to the signal control circuit 511 and the communication module 512. The drawworks hook 515 is located at the head of the drawworks for fixing the position of drawworks in the drill pipe. The pressure regulating piston 516 is located on the top of the drawworks, used to adjust the pressure balance inside the drawworks, while allowing wireless signals to pass through. The silicon sealing 518 is located on the inner side of the optical fiber outlet hole 519 for keeping the drawworks sealed when releasing fiber. The optical fiber outlet hole 519 is located at the bottom of drawworks, used to release optical fiber. When the drill pipe is splicing, the drawworks hook 515 is manually operated, to pull the drawworks up to the top position of the drill pipe to be spliced, i.e. the bottom position of the first drill pipe, and the drawworks releases the optical fiber from the fiber outlet hole 519 at the same time.

The drawworks sealing shell 501 is a metal shell which provides a stable working space for internal equipment. The top of which is welded with the drawworks hook 515, to facilitate the drawworks to be fixed in the drill pipe. In actual operation, the worker can lift the drawworks through the hook.

The optical fiber 510 is an ultrafine bare fiber that is insensitive to bending. The diameter of the optical fiber 510 is extremely thin, and the length of the winding storage on the optical fiber reel 506 exceeds 5000 m or more.

The application principle of the present invention will be further described below with reference to FIG. 1 and FIG. 2.

The rat hole 12 stores new drill pipe to be spliced. Since the kelly 1 and the protective connector 2 are both in rotating state, therefore the information exchange need to be proceeded by wireless means. The rotary wireless transceiver module 11 is fixed on the protective connector 2; the active antenna 3 of the rotary wireless transceiver module 11 is put into the first drill pipe 13 by drilling holes in the protective connector 2, at the same time, the active antenna 3 is released to the bottom of the first drill pipe 13 for transmitting and receiving wireless signals. The optical fiber communication drawworks 5 is located at the top part of the second drill pipe 14, the optical fiber 6 is released downwards into the other under-well drill pipe 15, the lower part of the optical fiber is connected to the well-bottom wireless receiving module 7. The lowest part of the drill pipe is drilling data acquisition device 9 and the well-bottom wireless transmitting module 8.

During normal drilling, the drilling data acquisition device 9 detects the under-well data and transmits the data to the well-bottom wireless receiving module 7 in the lower part of the optical fiber through the well-bottom wireless transmitting module 8. The optical fiber 6 serves as a transmission medium to send the logging data to communication drawworks 5 at the upper position of the drill pipe 14; the drawworks 5 transmits the data to the rotary wireless transceiver module 11 upon the well through the built-in wireless transceiver module 4 of the drawworks 5. Finally, the wireless transceiver module 11 performs wireless data exchange with the overground wireless transceiver module 16, the data ultimately gets to overground data collection console 17.

During the splicing of the drill pipe, the protective connector 2 is separated from the first drill pipe 13, and the antenna 3 of the rotary wireless transceiver module 11 is pulled out. The crane moves the kelly 1 to the position of the rat hole 12, and then put the antenna 3 of the rotary radio transceiver module into the new drill pipe needed to be spliced, the antenna 3 is released downwards to the bottom part of the new drill pipe to be spliced. The protective connector 2 is connected with the upper part of the new drill pipe. At this time the construction workers lift the drawworks located on the top part of the second drill pipe 14 to the top part of the first drill pipe 13, and fix the drawworks. At the same time the overground data collection console 17 transmits a control signal, to control the optical fiber communication drawworks 5 to release downwards the optical fiber 6 corresponding to the length of drill pipe. Then the crane will move the new drill pipe to the wellhead, and connect it with the first drill pipe 13 to complete the whole process of splicing the drill pipes. Operate circularly in this way, under the condition that normal drilling construction is not influenced, the entire process of underground optical fiber communications is completed.

The structure of the optical fiber communication drawworks is shown in FIG. 2, the motor driving circuit 503 is connected to the motor 504, the motor 504 is connected to the lower end of the optical fiber reel 506 and the lower end of the slide rail screw rod 509 through the decelerator 505. The optical fiber guider 507 is placed on the slide rail screw rod 509, during the operation of the motor 504, the optical fiber guider 507 can move along the guider slide rail rod 508. The optical fiber 510 is an ultrafine bare fiber and wound on the optical fiber reel 506. When the optical fiber needs to be released down the well, the optical fiber 510 wounded on the optical fiber reel 506 is released through the optical fiber guider 507 to prevent the optical fiber from being broken when being released. The signal control circuit 511 and the WiFi communication module 512 are connected with the transceiver antenna 510. The signal control circuit 511 modulates the optical signal transmitted by the optical fiber into an electrical signal, and transmits the signal outside the well through the WiFi communication module 512 and the antenna 513. The control signal outside the well enters the drawworks through the WiFi communication module 512. The wireless power supply coil transmitting terminal 514 is coupled with the wireless power supply coil receiving terminal 517 located on the antenna 513 to form a wireless power supply system for supplying power to the signal control circuit 511 and the communication module 512. The drawworks hook 515 is located on the head of drawworks, used for fixing the position of the drawworks inside the drill pipe. The pressure regulating piston 516 is located at the top of the drawworks for adjusting the pressure balance inside the drawworks, and allowing the wireless signals to pass through at the same time. The silicon sealing 518 is located at the inner side of the fiber outlet hole 519 to keep the drawworks sealed when releasing the optical fiber. The fiber outlet hole 519 is located at the bottom of the drawworks for releasing the optical fiber. While splicing the drill pipe, the drawworks hook 515 is manually operated to lift the drawworks to the top position of the subsequent drill pipe, i.e. the bottom position of the first drill pipe, and the drawworks releases the optical fiber from the fiber outlet hole 519 at the same time.

Considering the possible existence of the harsh environmental conditions such as high temperature and high pressure underground, the drawworks sealing shell 501 is a metal shell, to provide a stable working space for the internal equipment. The top part of which is welded with the drawworks hook 515 to facilitate the drawworks to be fixed in the drill pipe, during the actual operation the worker can pull the drawworks up through the hook.

The optical fiber 510 is an ultrafine bare fiber which is insensitive to bending, and the diameter of which is very small. And the length of the winding storage on the optical fiber reel 506 exceeds 5000 m or more. Since the optical fiber has a low weight, it needs to be pumped into the drill pipe through the mud pump at first. Meanwhile, since the ultrafine bare fiber is not sensitive to bending, the loss during the winding bending is low, and does not affect the communication. After the optical fiber is released from the drawworks through the optical fiber outlet hole 519, the optical fiber can fully withstand the tensile force without breaking when considering the buoyancy of the drilling fluid and the gravity of itself.

The motor driving circuit 503 controls the rotation speed of the motor 504. The decelerator 505 drives the optical fiber reel 506 and the slide rail screw rod 509 to work together at a fixed ratio of rotation speed, so that the fiber outlet end of the optical fiber reel 506 and the optical fiber guider 507 are located at the same position, to achieve safe retraction of the optical fiber 510 on the optical fiber reel 506.

Since the drill pipe is filled with the drilling mud while drilling, the hydraulic oil is filled inside the drawworks so as to maintain inside and outside pressure balance. When the optical fiber on the optical fiber reel is released continuously, the volume of remaining fiber is reduced and the pressure inside the drawworks is also reduced, the pressure regulating piston 516 moves under pressure at this time, so that to balance the pressure difference inside and outside of the drawworks.

Through the combination of the optical fiber and wireless communication, the present invention can transmit the underground logging signals to the ground without affecting the normal drilling operation. Fully integrate the entire optical fiber communication module such as the optical fiber reel, the wireless transceiver, the photoelectric conversion and the like into the drawworks. The drawworks can be placed into the drill pipe, and can be lifted with the drilling depth, avoiding the complicated operation procedures of the traditional cable logging and achieves the seamless continuation of the logging-while-drilling communication procedures; meanwhile, the features of low cost, strong anti-interference ability and high bandwidth of optical fibers, greatly improve the efficiency of logging-while-drilling communication. The whole optical fiber communication system is integrated into the drawworks. The diameter of drawworks is smaller than the diameter of the drill pipe and can be placed inside the drill pipe. The drawworks has wireless communication function, and can transmit and receive the logging information and the overground control information wirelessly. The power supply mode of the internal communication system is the wireless coil power supply; in the process of drilling into the drill pipe to be spliced, the position of the drawworks inside the drill pipe can be manually raised. The high-strength bare fiber with small bending radius can be used, and each meter of reel can be wound with more than 5000 m.

The above description describes only a preferred embodiment of the present invention, but is not intended to limit the present invention in any way. Any simple modifications, equivalent changes and modifications made to the above embodiments according to the technical solutions of the present invention belong to the scope of the technical solutions.

What is claimed is:

1. A logging-while-drilling optical fiber communication device, comprising:
   a rotary wireless transceiver module; wherein
   the rotary wireless transceiver module is fixed on a protective connector;
   a drill pipe comprises a first drill pipe, a second drill pipe and a set of third under-well drill pipes;
   an active antenna of the rotary wireless transceiver module is put into the first drill pipe by drilling a hole through the protective connector;
   an optical fiber communication drawworks is located at a top part of the second drill pipe, an optical fiber is released downwards into the set of third under-well drill pipes, and a lower part of the optical fiber is connected with a well-bottom wireless receiving module;
   the optical fiber communication drawworks is placed inside the drill pipe and can move upwards and downwards inside the drill pipe while proceeding the drilling process, and the optical fiber communication drawworks can retract and release the optical fiber;
   a lowest part of the third under-well drill pipes is a drilling data acquisition device and a well-bottom wireless transmitting module;
   wherein, the drilling data acquisition device is configured to detect under-well data and transmit the under-well data to the well-bottom wireless receiving module through the well-bottom wireless transmitting module;
   the well-bottom wireless receiving module transmits the under-well data to the rotary wireless transceiver module through the optical fiber communication drawworks.

2. The logging-while-drilling optical fiber communication device according to claim 1, wherein the rotary wireless transceiver module is wirelessly connected with an overground wireless transceiver module, and the overground wireless transceiver module is connected to an overground data collection console.

3. The logging-while-drilling optical fiber communication device according to claim 1, wherein the logging-while-drilling optical fiber communication device is configured to transmit data through a plurality of waves with short-wave wavelength of 650 nm or 850 nm.

* * * * *